United States Patent
Kim et al.

(10) Patent No.: US 11,048,758 B1
(45) Date of Patent: Jun. 29, 2021

(54) MULTI-LEVEL LOW-LATENCY HASHING SCHEME

(71) Applicant: MORGAN STANLEY SERVICES GROUP INC., New York, NY (US)

(72) Inventors: Changhoan Kim, West New York, NJ (US); Sunghyun Park, Tenafly, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/779,282

(22) Filed: Jan. 31, 2020

(51) Int. Cl.
| | |
|---|---|
| *G06F 16/903* | (2019.01) |
| *G06F 16/901* | (2019.01) |
| *H04L 9/06* | (2006.01) |
| *G06F 30/347* | (2020.01) |
| *G06F 9/30* | (2018.01) |
| *G06F 7/72* | (2006.01) |
| *G06F 9/54* | (2006.01) |
| *G11C 15/04* | (2006.01) |

(52) U.S. Cl.
CPC ........ *G06F 16/90339* (2019.01); *G06F 7/721* (2013.01); *G06F 9/30029* (2013.01); *G06F 9/547* (2013.01); *G06F 16/9014* (2019.01); *G06F 30/347* (2020.01); *G11C 15/04* (2013.01); *H04L 9/0643* (2013.01)

(58) Field of Classification Search
None
See application file for complete search history.

(56) References Cited

U.S. PATENT DOCUMENTS

| | | | |
|---|---|---|---|
| 6,735,670 B1 * | 5/2004 | Bronstein | H04L 45/745 365/49.1 |
| 2013/0343181 A1 | 12/2013 | Stroud | |
| 2015/0121034 A1 | 4/2015 | Steele | |
| 2015/0121035 A1 | 4/2015 | Steele | |
| 2015/0169467 A1 | 6/2015 | Chase | |
| 2016/0259724 A1 | 9/2016 | Steele | |
| 2019/0042440 A1 | 2/2019 | Kumar | |

OTHER PUBLICATIONS

Kirsch, Adam and Michael Mitzenmacher, "Simple Summaries for Hashing with Choices", IEEE/ACM Transactions on Networking, vol. 16, No. 1, Feb. 2008.

* cited by examiner

*Primary Examiner* — James G Norman
(74) *Attorney, Agent, or Firm* — Weitzman Law Offices, LLC (57) ABSTRACT

A system for storing and looking up values via hash table is disclosed. The system comprises multiple hash tables, each hash table being associated with a different hashing function and a content addressable memory (CAM). One or more processors receive a request to store a value; generate hashes of the value via each of the hashing functions; determine whether there exists at least one hash table that has a vacancy for the value; and if the determination is positive, insert the value in one of the at least one hash tables having the vacancy, and if the determination is negative, insert the value in the CAM. The processors also receive a request to look up a value; determine whether any of the hash tables or the CAM contain the value; and return the determination of whether the any of the plurality of hash tables or the CAM contain the value.

16 Claims, 7 Drawing Sheets

MULTI-LEVEL LOW-LATENCY HASHING SCHEME

FIELD OF INVENTION

This application relates to devices and data structures for ultra-low latency data storage and retrieval, and more specifically, to systems and methods for a network-connected device using a field programmable gate array to store information in a specialized structure hash tables and a content addressable memory.

BACKGROUND

In certain application contexts, a computer system may have need of a storage system with extremely low latency insert, lookup, and delete methods. Historically, hash tables have served well in this role. Rather than entering data in a sequence and looking up a value by iterating over the whole table (which grows as new values are entered, slowing down later lookups), a hash table places a value at a particular index of location in a table of fixed size. The index is determined by a hashing function, a function that receives the value to be inserted as an input, and returns an index within the range defined by the size of the table. Lookups thus require no iteration over the table, as the hashing function can show exactly where a value will be if it is present in the table.

However, there is still inefficiency caused by "hash collisions", where two values produce the same output when input into the hashing function. Because each index in the hash table is unique, the lookup will be slowed if collisions are possible, because software must look not only in the intended location, but in any other location that a value might have been stored if the intended location was already in use.

The smaller the space allocated to the hash table, the more likely collisions will be, since the hashing function will map a domain of possible inputs to a smaller set of possible indices within the hash table. However, ultra-low latency memory can be costly.

Thus, there is a need for more efficient hash table setups that reduce collisions without increasing the total space devoted to storage.

SUMMARY OF THE INVENTION

A system for storing and looking up values via hash table is disclosed. The system comprises a plurality of hash tables, each hash table being associated with a different hashing function from a plurality of hashing functions, a content addressable memory (CAM), and one or more processors. The one or more processors execute instructions that cause the one or more processors to: receive a request to store a first value; generate a plurality of hashes of the first value, one hash being generated from each of the plurality of hashing functions; determine whether there exists at least one hash table of the plurality of hash tables that has a vacancy at an index indicated by a hash generated by the hashing function with which that hash table is associated; and if the determination is positive, insert the first value in one of the at least one hash tables having the vacancy, and if the determination is negative, insert the first value in the CAM. The one or more processors also receive a request to look up a second value; generate a plurality of hashes of the second value, one from each of the plurality of different hashing functions; determine whether any of the plurality of hash tables contain the second value by, for each hash table, comparing the second value with a stored value in that hash table, if any, at an index indicated by the hash of the second value generated by the hashing function with which that hash table is associated; and return, to a source that transmitted the request to look up the value, a determination of whether the any of the plurality of hash tables or the CAM contain the value.

A computer implemented method for storing and looking up values via hash table is also disclosed. The method comprises receiving a request to store a first value; generating a plurality of hashes of the first value, one hash being generated from each of a plurality of hashing functions, each hashing function being associated with a different hash table; determining whether there exists at least one hash table of the plurality of hash tables that has a vacancy at an index indicated by a hash generated by the hashing function with which that hash table is associated; if the determination is positive, inserting the first value in one of the at least one hash tables having the vacancy, and if the determination is negative, inserting the first value in a content addressable memory; receiving a request to look up a second value; generating a plurality of hashes of the second value, one from each of the plurality of different hashing functions; determining whether any of the plurality of hash tables contain the second value by, for each hash table, comparing the second value with a stored value in that hash table, if any, at an index indicated by the hash of the second value generated by the hashing function with which that hash table is associated; and returning, to a source that transmitted the request to look up the second value, a determination of whether the any of the plurality of hash tables or the CAM contain the second value.

In some embodiments, the hashing functions comprise reordering the bits of the first value or of the second value, a bitwise XOR operation between a predetermined constant and the bits of the first value or of the second value, and a modular division operation on a reordered and bitwise XOR'd value to distribute that value evenly in a range of possible indices for a hash table.

In some embodiments, processing is performed in parallel by a field-programmable gate array (FPGA) to minimize latency.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

In order to address the issues described above, a network-connected device using a field programmable gate array (FPGA) to store information in a specialized structure of hash tables and a content addressable memory (CAM) is disclosed.

Figure 1:
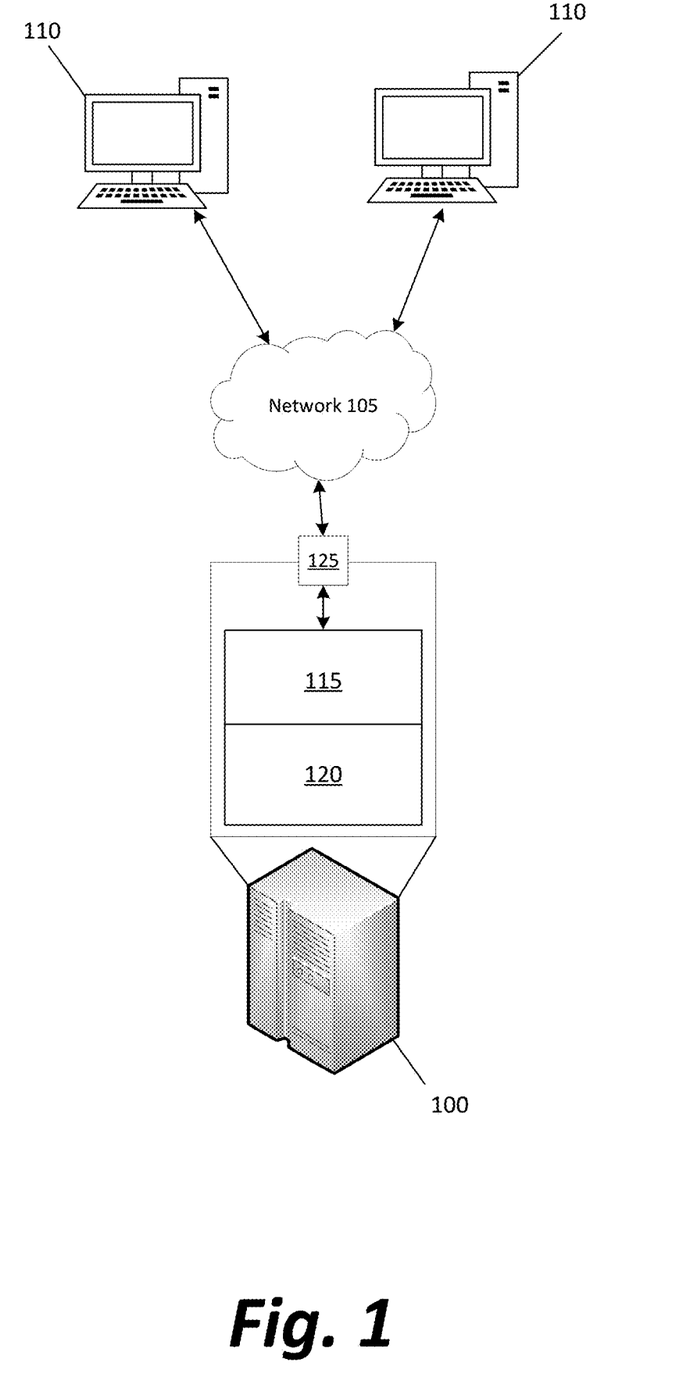
FIG. 1 depicts a network of computing devices communicating with one another to store and retrieve values with ultra-low latency according to methods disclosed herein.

FIG. 1 depicts a network of computing devices communicating with one another to store and retrieve values with ultra-low latency according to methods disclosed herein.

A computing device 100 is connected to a network 105 to provide a service (for example, an application programming interface (API)) that permits any other computing devices 110 that may happen to be connected the network to request storage, lookup, or deletion of arbitrary values. In other embodiments, rather than providing an API, computing device 100 may observe network traffic and use the data structures and retrieval methods described below to act independently of any other computing devices 110 of the network 105.

In one embodiment, the data storage functions of computing device 100 may be used as part of a failsafe to determine whether a particular message that was meant to be sent a single time has already been sent, before acting on it. For example, if a human user attempts to send a text message, or a stock trader attempts to submit an order to purchase an asset, but there is no confirmation from the remote server that the message has been received, the human user or the software library handling the messaging protocol (such as a TCP library that has not received an acknowledgement packet) may cause the message to be transmitted a second time. An outbound gateway may store all outgoing messages in computing device 100 and refuse to retransmit a message that has already been sent through the gateway.

In another embodiment, a firewall may attempt to detect and prevent denial of service attacks by storing incoming messages or attributes of those messages in a hash table, and refusing incoming messages if they have the same characteristics as messages previously stored in computing device 100.

Nevertheless, the structure and methods described below are not limited to any particular application and are completely agnostic regarding the nature or the purpose of the data being processed; they merely ensure that hash collisions are minimized and that insertion, lookup, and deletion functionality are ultra-low latency to better serve as the basis for any software application needing to store and retrieve data.

In a preferred embodiment, computing device 100 includes a field programmable gate array (FPGA) 115 to perform a large number of tasks described below simultaneously in parallel by various modules. However, while the methods described further below are intended to take advantage of parallel processing to absolutely minimize latency, nothing described below inherently requires the use of an FPGA, nor even of parallel computing in general; every task described as "parallel" could theoretically be performed by a single core processor performing each task in sequence, albeit with a massive increase in undesired latency.

Figure 2:
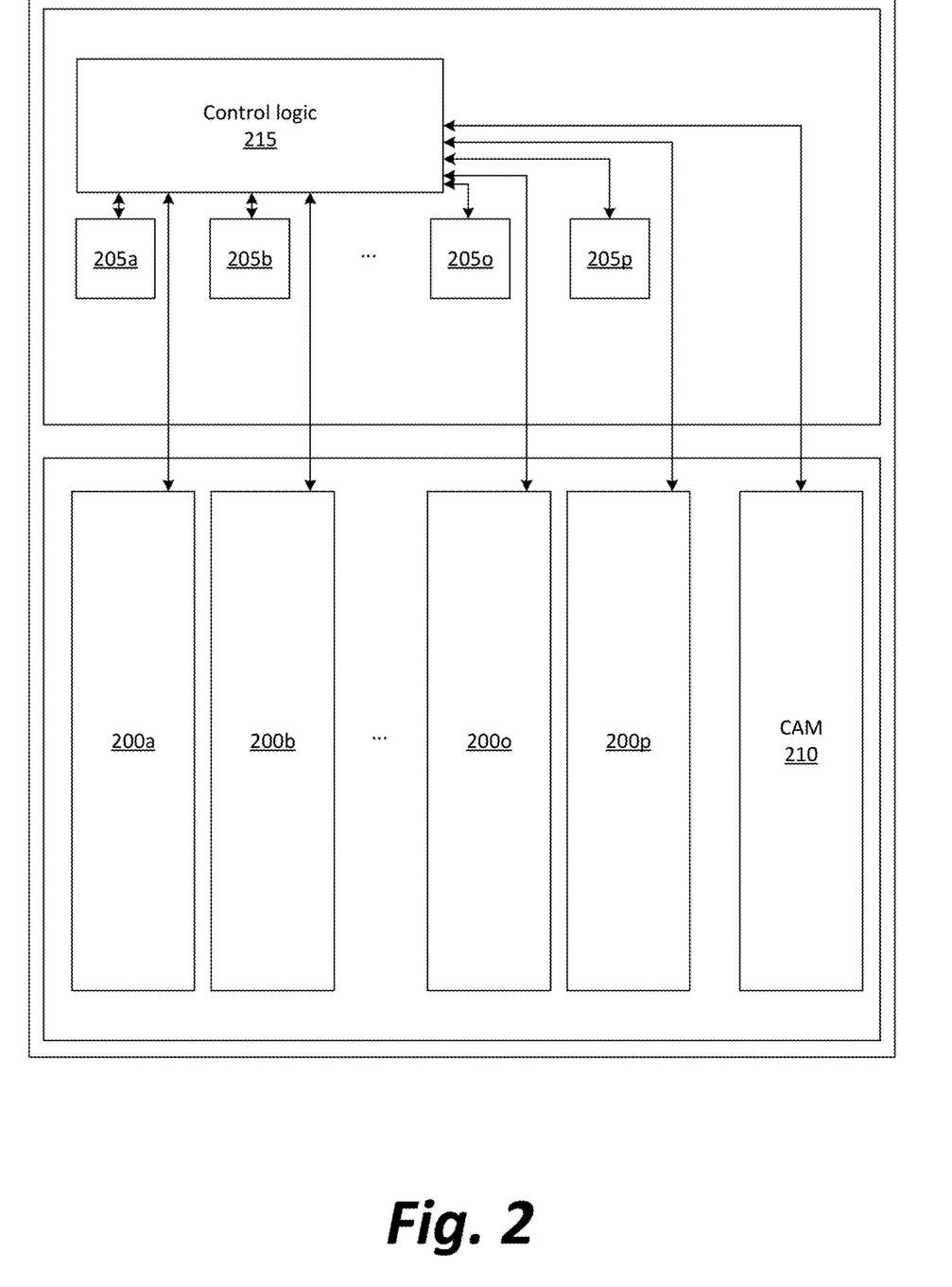
FIG. 2 depicts in greater detail the internal organization of a preferred computing device for storing values according to methods disclosed herein.

Computing device 100 also includes memory 120—the configuration of which is described in much greater detail in FIG. 2—for storing values in particular memory locations as determined by the FPGA 115. Computing device 100 also by necessity includes some sort of network interface 125 for receiving information from and sending responses back to the network 105, whether that network interface be a WiFi transmitter and receiver, an ethernet interface, or any other form of wired or wireless communications interface.

Although a system is described here in which a single computing device 100 performs a number of functions, other configurations are possible in which functions are divided among multiple devices. For example, memory 120, instead of being contained within a single device with FPGA 115, could theoretically be in one or more remote databases. Similarly, the parallel processing capabilities of FPGA 115 could be divided between a number of processors in separate computing devices, with computing device 100 merely acting as a coordinator to send processing tasks to and receive output from those separate computing devices. However, such configurations would be strongly dispreferred, as they would inevitably increase latency beyond the needs of an ultra-low latency application.

FIG. 2 depicts in greater detail the internal organization of a preferred computing device for storing values according to methods disclosed herein.

In a preferred embodiment, memory 120 includes sixteen distinct hash tables 200a-200p (corresponding to a set of hash generators 205a-205p), and a content-addressable memory (CAM) 210.

For each of the hash tables 200, the corresponding hashing generator 205 is used to call a hashing function on values that will be inserted into that hash table, to determine the index at which the data may be stored. The hash function need not be cryptographically secure; it need only minimize collisions and be performable as quickly as possible. In a preferred embodiment, the hashing function has three steps, which are depicted in FIG. 3.

When the system receives a request to insert, look up, or delete a value, the value is preferably hashed sixteen times in parallel by the hashing generators 205 in order to determine the possible places in memory that the value can be inserted into, found at, or deleted from, as is described in further detail in the discussion of FIGS. 4, 5, and 6 below. A control logic module 215 in communication with the generators 205 and the memory 120 decides where to store data, verifies that the data is present, or causes the deletion of the data, as requested.

Figure 3:
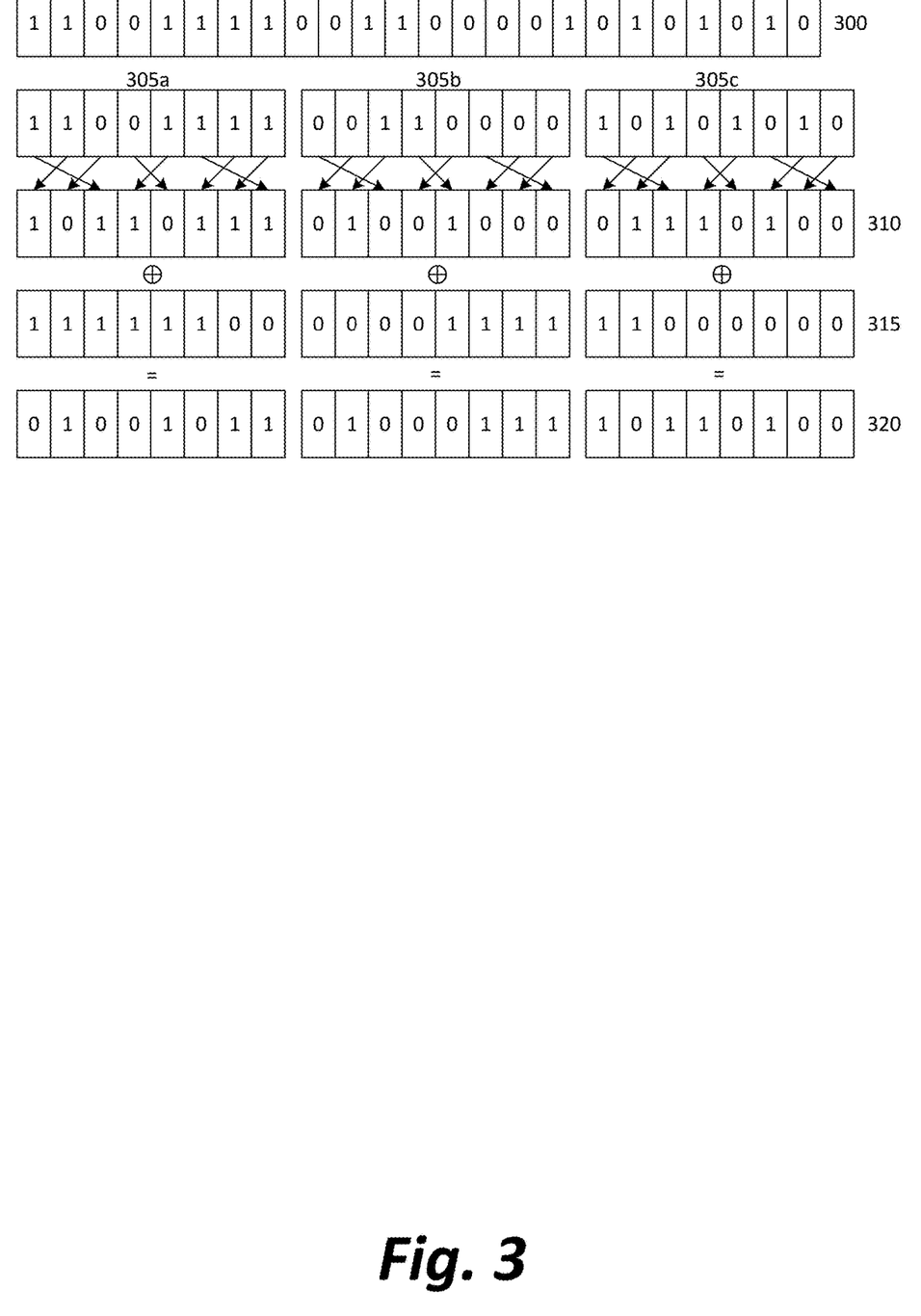
FIG. 3 depicts steps in manipulation of bits of a value during a possible hashing process in conjunction with methods disclosed herein.

FIG. 3 depicts steps in manipulation of bits of a value during a possible hashing process in conjunction with methods disclosed herein.

Initially, an input value 300, expressed as a series of bits, is deterministically rearranged according to a pre-set pattern. For example, as depicted, the series of bits may be divided into portions 305 of eight bits each, and each portion rearranged such that the first bit of the portion moves to the third position, the second bit moves to the first position, the third bit moves to the first position, and so on. This results in a rearranged bit string 310. In the depicted example, the input string 300 with bits "11001111001100010101010" may be rearranged to a resulting string 310 with bits "10110111010010000111010100".

More complicated reorderings are permissible, and there is no inherent reason that reorderings of only sets of eight bits at a time are necessary; any mapping of $\{0 \ldots L\}$ to $\{0 \ldots L\}$, where L is the maximum length of the input bit string, may be used. Each hash generator 205 may store a different reordering mapping to cause different hashes to be generated for a given input value.

The bit string 310 then undergoes the bitwise XOR operation with a predefined constant 315 to produce a new string 320. In the depicted example, the predefined constant string 315 is "1111110000001111111000000", and the rearranged string 310 XOR the constant string 315—i.e., "10110111010010001110100" ® "1111110000001111111000000"-results in the output string 320 ("010010110100011110110100"). There is no need that the predefined constant string match the input value in length; the constant may be truncated if too long or repeated if too short. Different predefined constants may be stored in each of the hash generators 205 to further distinguish the outputs of each of the hash generators for a given input value.

It may be observed that the ordering of the rearrangement and XOR steps is technically reversible—there exists some different predefined constant 315 that could be chosen such that applying the XOR step first, and then a deterministic rearrangement, would result in the same outcome 320.

Finally, the resultant string 320 is converted into an equivalent integer and its value modulus N is determined, where N is the total number of values that can be stored in each of the hash tables. Thus, for example, if each of the hash tables stores up to 625 values, the final outcome of the hash function is (the integer equivalent of bit string 320) % 625. As a result, the generated indices are roughly equally distributed in the range from 0 to N, regardless of the nature of the input values.

Hash functions of this family (with different rearrangements and XOR constants) may be used for each of the hash tables in order to implement insertion, lookup, and deletion methods as described below.

Figure 4:
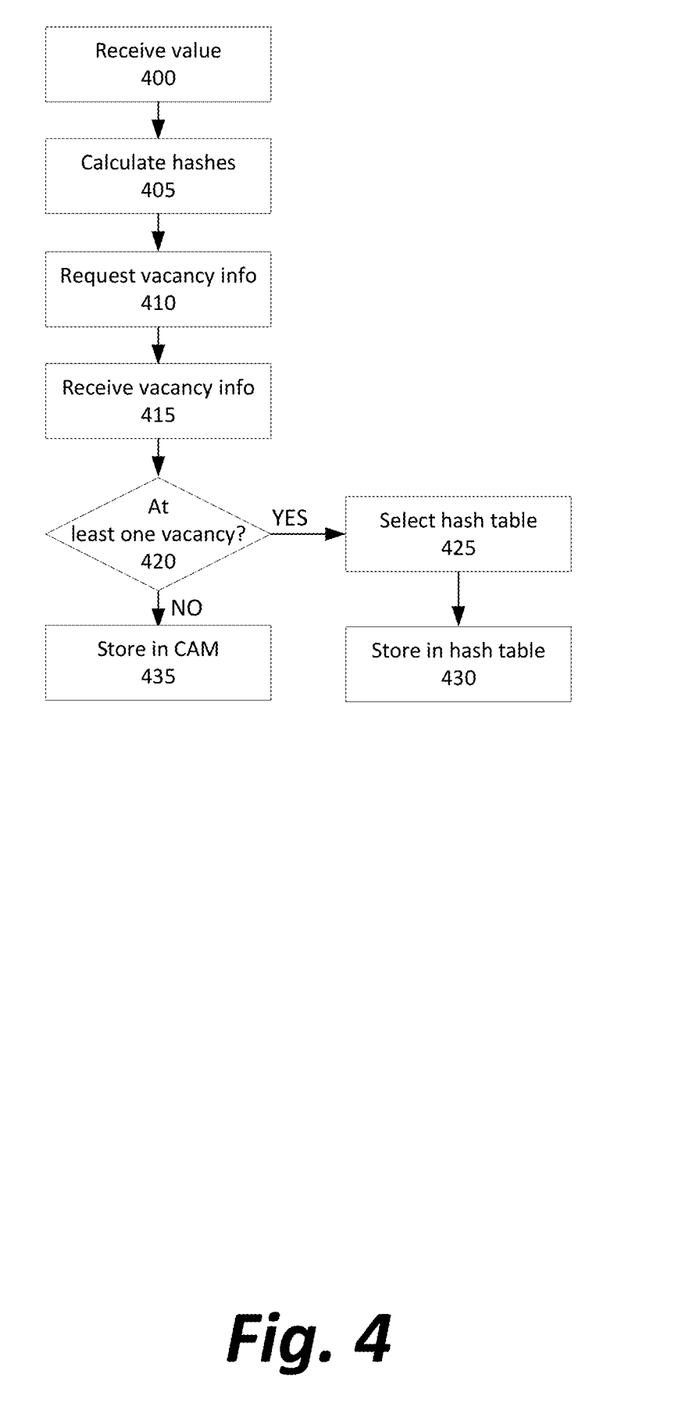
FIG. 4 depicts a method for inserting a value into a hash table according to methods disclosed herein.

FIG. 4 depicts a method for inserting a value into a hash table according to methods disclosed herein.

Initially, a value is received by computing device 100 along with whatever metadata (for example, an API call or other structured data) is necessary to indicate that the desired operation is insertion, as opposed to lookup or deletion (Step 400).

Next, the value is forwarded to each of the set of hash generators for hashes to be calculated in parallel by each of the hash generators for the input, according to the hash function family described above or any alternative hash function that may be selected based on a particular application need (Step 405).

Each hash value is looked up, in parallel, in its corresponding hash table to see whether that index is free for use (Step 410). Thus, for example, if the first hash generator returns a hash of "100", the second hash generator returns a hash of "350", and so on, the control logic requests whether the first hash table is storing any value in the 100$^{th}$ position, whether the second hash table is storing any value in the 350$^{th}$ position, and so on.

The responses of whether an index is vacant are returned to the control logic as bits (1 for "free" and 0 for "in use") concatenated into a string or array of sixteen bits (Step 415). For example, if fourteen of the hash tables are occupied at that index, but the second and seventh among them are not and can be used for an insertion at that index, the control logic might be provided with the string "0100001000000000". In other embodiments, a data structure other than a bit string may be used, though a simpler data structure, such as the two-byte allocation needed for this example bit string, is preferable to reduce processing overhead and reduce necessary working memory.

If there is at least one bit among the string of bits that indicates a vacancy (Step 420), the control logic selects one of the hash tables whose bit in the bit string indicates a vacancy (Step 425).

The selection process may be as simple as selecting the first or left-most vacancy indicated within the bit string, If the example bit string provided above, "0100001000000000" is used, the control logic may simply blindly choose the second hash table, being the first vacancy found.

In other potential embodiments, the selection process may be more complex or sophisticated, such selecting pseudo-randomly from among the vacancies each time one must be selected, or even tracking the relative fullness of the hash tables over a period of time and selecting the fullest or least-full of those tables having vacancies at the given indices.

After selection of one hash table with a vacancy, the value is sent to the selected hash table and stored therein (Step 430).

If, on the other hand, there was no vacancy among all the hash tables, the value is instead stored in the CAM 210 (Step 435), which acts as an overflow buffer for storage only when values cannot be stored in any of the hash tables 200, because each of the hash tables is occupied at the index indicated by hashing the value to be inserted.

Figure 5:
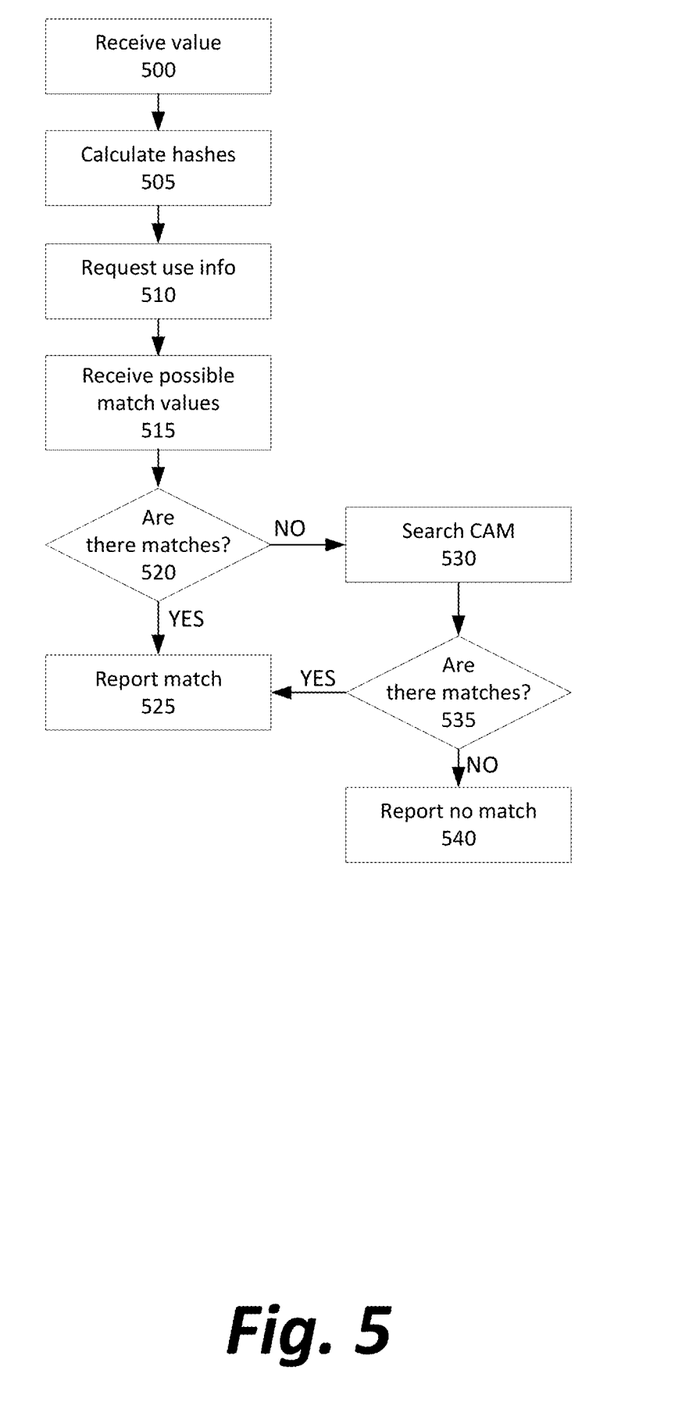
FIG. 5 depicts a method for looking up a value in a hash table according to methods disclosed herein.

FIG. 5 depicts a method for looking up a value in a hash table according to methods disclosed herein.

Initially, a value is received by computing device 100 along with whatever metadata (for example, an API call or other structured data) is necessary to indicate that the desired operation is a lookup, as opposed to insertion or deletion (Step 500).

Next, as with insertion, the value is forwarded to each of the set of hash generators for hashes to be calculated in parallel by each of the hash generators for the input, according to whatever hash functions are being used for insertion (Step 505).

Each computed hash value is looked up, in parallel, in its corresponding hash table to see whether that index is currently in use to store a value (Step 510). For every hash table that is storing something at that index, the value at that index is retrieved and sent to the control logic (Step 515).

If values are received, the control logic determines whether any is a match (Step 520). If there is a match, the confirmation of the match is reported to whatever entity requested the lookup operation (Step 525).

If there is no hash table that is possibly storing the value, or if all possible matches prove to be hash collisions for that particular hash function rather than the same value, the control logic searches through the CAM 210 for the value (Step 530). If the value is found (Step 535), confirmation of the match is reported (Step 525); otherwise, a failure to find a match is reported (Step 540).

The presently described method avoids a search of CAM 210 until it proves necessary by a failure to find the value first in one of the hash tables 200, but in an alternative embodiment, the control logic may query the CAM at the same time as the hash tables, relying on parallel processing to find any possible match as fast as possible.

Figure 6:
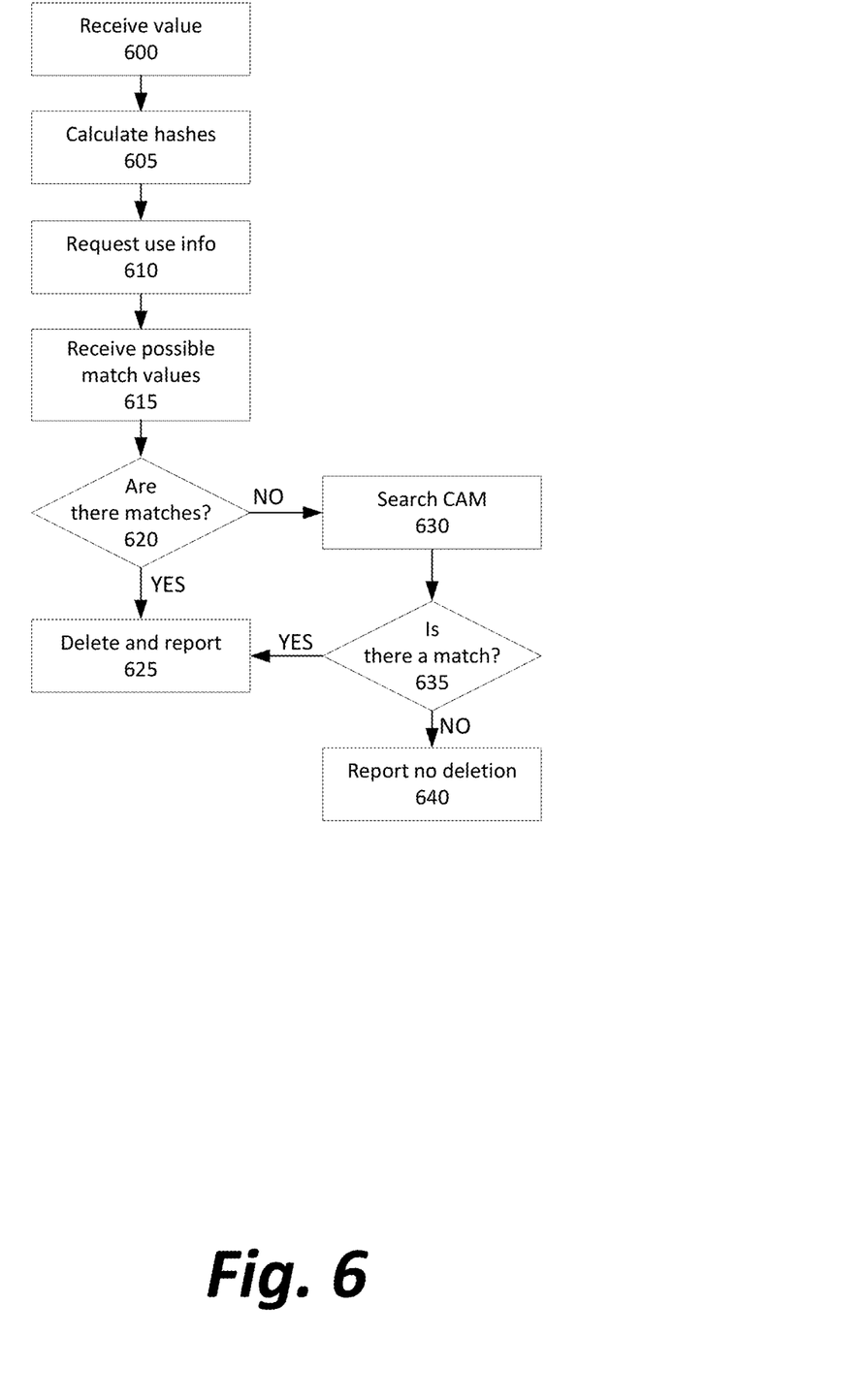
FIG. 6 depicts a method for deleting a value from a hash table according to methods disclosed herein.

FIG. 6 depicts a method for deleting a value from a hash table according to methods disclosed herein.

Initially, a value is received by computing device 100 along with whatever metadata (for example, an API call or other structured data) is necessary to indicate that the desired operation is deletion, as opposed to a lookup or insertion (Step 600).

Next, as with insertion and lookup, the value is forwarded to each of the set of hash generators for hashes to be calculated in parallel by each of the hash generators for the input, according to whatever hash functions are being used for insertion (Step 605).

Each computed hash value is looked up, in parallel, in its corresponding hash table to see whether that index is currently in use to store a value (Step 610). For every hash table that is storing something at that index, the value is retrieved and sent to the control logic (Step 615).

If values are received, the control logic determines whether any is a match (Step 620). If there is a match, the value is deleted from that hash table and confirmation of the deletion may be reported to whatever entity requested the delete operation (Step 625).

If there is no hash table that is possibly storing the value, or if all possible matches prove to be hash collisions for that particular hash function rather than the same value, the control logic searches through the CAM 210 for the value (Step 630). If the value is found (Step 635), the value is deleted and confirmation of the deletion is reported (Step 625); otherwise, a failure to delete the value is reported (Step 640).

As with lookup, the presently described method avoids a search of CAM 210 until it proves necessary by a failure to find the value first in one of the hash tables 200, but in an alternative embodiment, the control logic may query the CAM at the same time as the hash tables, relying on parallel processing to find any possible match as fast as possible.

The number of hash tables in the preferred embodiment (sixteen) has been selected based on empirical testing to determine the minimum number of tables needed to avoid hash collisions on test data sets related to applications in practice. However, a particular application, a particular hashing function family, or another design choice may ultimately have a need for a number of hash tables greater than sixteen, or may not have need for as many hash tables. The particular arrangement described has shown an unexpectedly low rate of hash collisions—for example, when sixteen tables of size 625 are used (for a total hash storage of 10,000) plus a CAM with storage for only 64 entries, testing showed that 9,574 typical values could be entered before an irresolvable collision occurred, i.e., with the CAM being full and all sixteen tables being occupied at the preferred location for that value. A hashing efficiency of 95.7%, allowing a hash table to function when being assigned only 1.08 times as much memory as the total set of values it is expected to store, is a significant and unexpected improvement in memory footprint over other hash table structures in the art, and dramatically reduces the time for operations compared to a non-hash table solution.

Moreover, the parallel processing for managing the plurality of hash tables is particularly well suited to the environment of an FPGA to reduce latency even further by embedding the logic at the hardware level and distributing processing between a series of modules of the FPGA.

Figure 7:
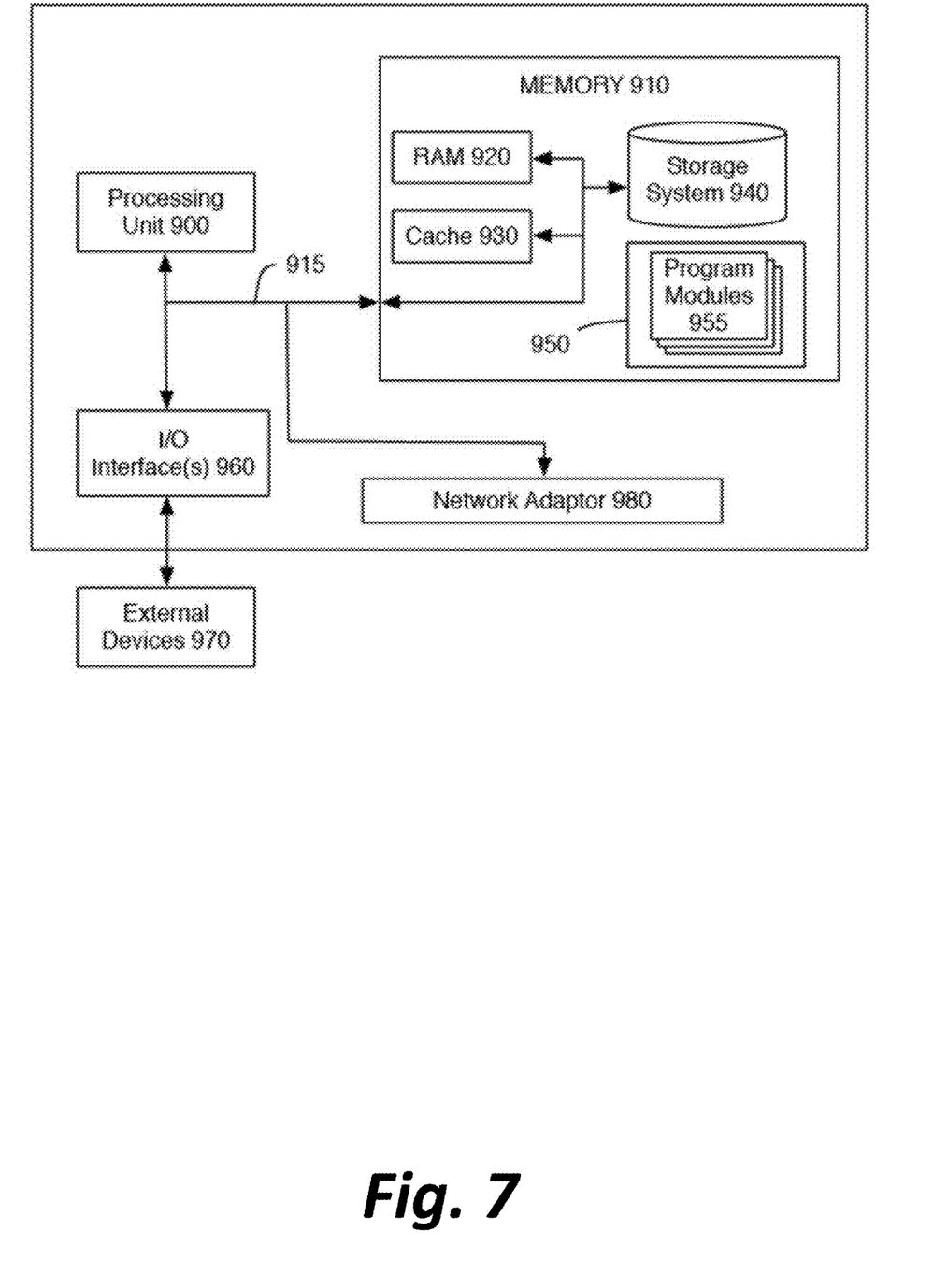
FIG. 7 is a high-level block diagram of a representative computing device that may be utilized to implement various features and processes described herein.

Although FIGS. 1 and 2 depict a preferred configuration of computing device using an FPGA and parallel computing to accomplish the software-implemented methods described above, those methods do not inherently rely on the use of any particular specialized computing devices, as opposed to standard desktop computers and/or web servers. For the purpose of illustrating possible such computing devices, FIG. 7 is a high-level block diagram of a representative computing device that may be utilized as computing device 100 to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for storing and looking up values via hash table, comprising:
    a plurality of hash tables, each hash table being associated with a different hashing function from a plurality of hashing functions,
    a content addressable memory (CAM), and
    one or more processors executing instructions that, when executed, cause the one or more processors to:
        receive a request to store a first value;
        generate a plurality of hashes of the first value, one hash being generated from each of the plurality of hashing functions;
        determine whether there exists at least one hash table of the plurality of hash tables that has a vacancy at an index indicated by a hash generated by the hashing function with which that hash table is associated;
        if the determination is positive, insert the first value in one of the at least one hash tables having the vacancy, and if the determination is negative, insert the first value in the CAM;
        receive a request to look up a second value;
        generate a plurality of hashes of the second value, one hash from each of the plurality of different hashing functions;
        determine whether any hash table of the plurality of hash tables contain the second value by, for each hash table, comparing the second value with a stored value in that hash table, if any, at an index indicated by the hash of the second value generated by the hashing function with which that hash table is associated;
        return, to a source that transmitted the request to look up the second value, a determination of whether any hash table of the plurality of hash tables or the CAM contain the second value;
        receive a request to delete a third value;
        generate a plurality of hashes of the third value, one from each of the plurality of different hashing functions;
        determine whether any of the plurality of hash tables contain the third value by, for each hash table, comparing the third value with a stored value in that hash table, if any, at an index indicated by the hash of the third value generated by the hashing function with which that hash table is associated; and
        delete, either from one hash table of the plurality of hash tables or from the CAM, a stored instance of the third value, wherein the deletion of the stored instance involves a delete operation from the CAM only if the plurality of hash tables are determined not to store the third value.

2. The system of claim 1, wherein the determination of whether the any hash table of the plurality of hash tables or the CAM contain the second value involves a read operation on the CAM only if the plurality of hash tables are determined not to store the second value.

3. The system of claim 1, wherein the plurality of hashing functions each comprise reordering the bits of the first value or of the second value.

4. The system of claim 3, wherein the plurality of hashing functions each comprise a bitwise XOR operation between a predetermined constant and the bits of the first value or of the second value.

5. The system of claim 4, wherein the plurality of hashing functions each comprise a modular division operation on a reordered and bitwise XOR'd value to distribute that value evenly in a range of possible indices for a hash table.

6. The system of claim 1, wherein the one or more processors are coupled to a network and provide an application programming interface (API) for insertion, lookup, and deletion commands to other computing devices coupled to the network.

7. The system of claim 1, wherein generation of a plurality of hashes of the first value or of the second value are performed in parallel and simultaneously by a plurality of processors.

8. The system of claim 7, wherein the plurality of processors are part of a field-programmable gate array (FPGA).

9. A computer implemented method for storing and looking up values via hash table, comprising:
    receiving a request to store a first value;
    generating a plurality of hashes of the first value, one hash being generated from each of a plurality of hashing functions, each hashing function being associated with a different hash table;
    determining whether there exists at least one hash table of the plurality of hash tables that has a vacancy at an index indicated by a hash generated by the hashing function with which that hash table is associated;
    if the determination is positive, inserting the first value in one of the at least one hash tables having the vacancy, and if the determination is negative, inserting the first value in a content addressable memory (CAM);
    receiving a request to look up a second value;
    generating a plurality of hashes of the second value, one from each of the plurality of different hashing functions;
    determining whether any of the plurality of hash tables contain the second value by, for each hash table, comparing the second value with a stored value in that hash table, if any, at an index indicated by the hash of the second value generated by the hashing function with which that hash table is associated; and
    returning, to a source that transmitted the request to look up the second value, a determination of whether any hash table of the plurality of hash tables or the CAM contain the second value;
    receiving a request to delete a third value;

generating, simultaneously via the plurality of processors working in parallel, a plurality of hashes of the third value, one from each of the plurality of different hashing functions;

determining whether any of the plurality of hash tables contain the third value by, for each hash table, comparing the third value with a stored value in that hash table, if any, at an index indicated by the hash of the third value generated by the hashing function with which that hash table is associated; and deleting, either from one hash table of the plurality of hash tables or from the CAM, a stored instance of the third value, wherein the deletion of the stored instance involves a delete operation from the CAM only if the plurality of hash tables are determined not to store the third value.

10. The method of claim 9, wherein the determination of whether the any hash table of the plurality of hash tables or the CAM contain the second value involves a read operation on the CAM only if the plurality of hash tables are determined not to store the second value.

11. The method of claim 9, wherein the plurality of hashing functions each comprise reordering the bits of the first value or of the second value.

12. The method of claim 11, wherein the plurality of hashing functions each comprise a bitwise XOR operation between a predetermined constant and the bits of the first value or of the second value.

13. The method of claim 12, wherein the plurality of hashing functions each comprise a modular division operation on a reordered and bitwise XOR'd value to distribute that value evenly in a range of possible indices for a hash table.

14. The method of claim 9, further comprising:

providing an application programming interface (API) for insertion, lookup, and deletion commands to other computing devices coupled to a network.

15. The method of claim 9, wherein generation of a plurality of hashes of the first value or of the second value are performed in parallel and simultaneously by a plurality of processors.

16. The method of claim 15, wherein the plurality of processors are part of a field-programmable gate array (FPGA).

* * * * *